July 23, 1946.　　　R. B. COLLINS　　　2,404,474
APPARATUS FOR MEASURING CARBONACEOUS DEPOSITS
Filed Nov. 29, 1944
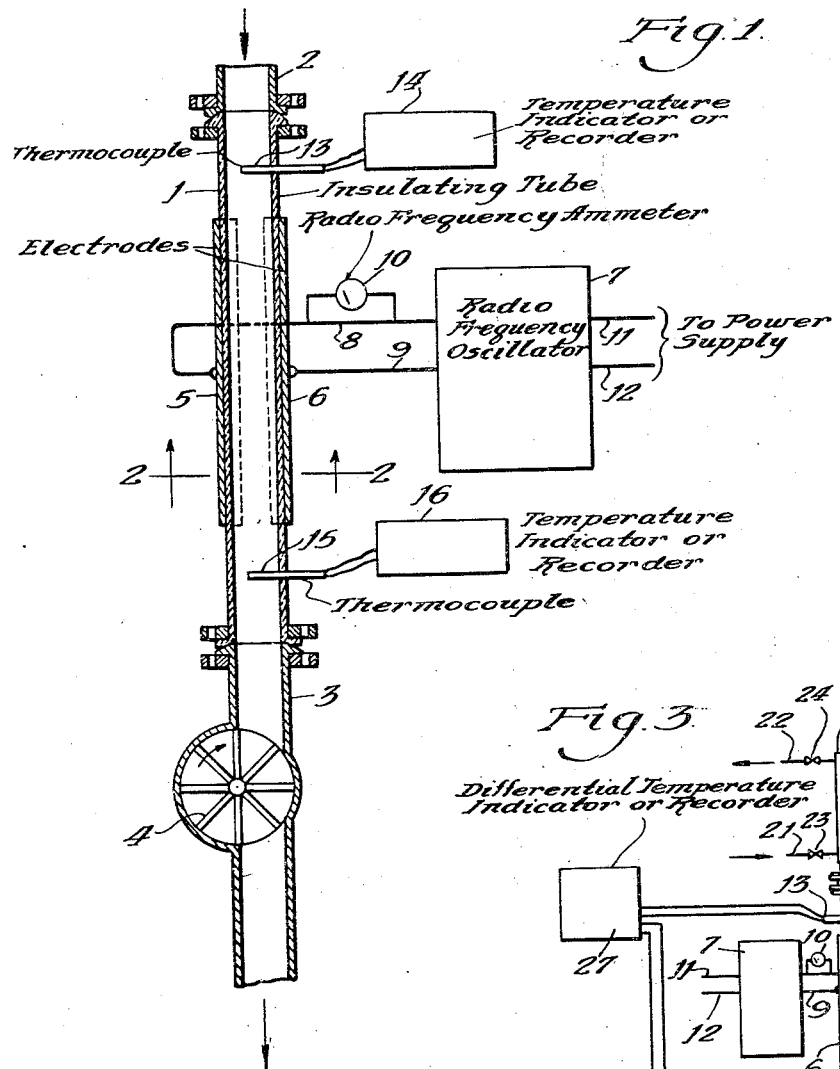
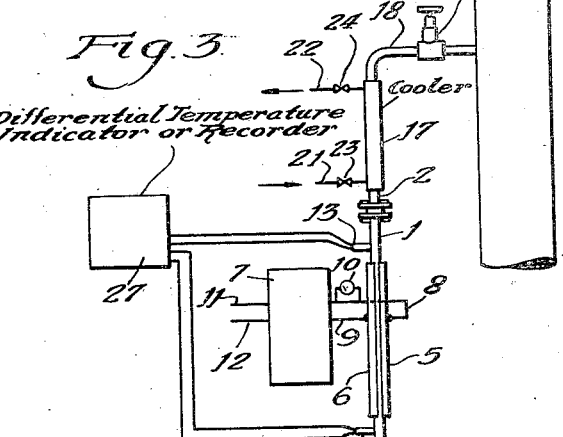
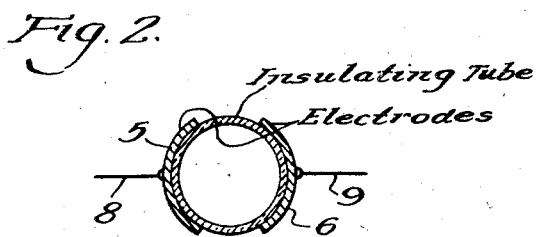
Inventor:
Robert B. Collins
By: Lee J. Gary
Attorney.

Patented July 23, 1946

2,404,474

UNITED STATES PATENT OFFICE 2,404,474

APPARATUS FOR MEASURING CARBONACEOUS DEPOSITS

Robert B. Collins, Downers Grove, Ill., assignor to Universal Oil Products Company, Chicago, Ill., a corporation of Delaware Application November 29, 1944, Serial No. 565,769

4 Claims. (Cl. 73—15)

This invention relates to an improved type of apparatus for the continuous determination of the chemical composition of various materials and more particularly, an apparatus for the continuous determination of carbonaceous deposit on catalytic materials.

During the treatment of hydrocarbons in various processes, such as cracking, reforming, dehydrogenation, and the like, some of the charging material is converted to a high molecular weight carbonaceous deposit which accumulates on the catalyst particles and is generally removed by combustion in order to render the catalyst suitable for continued use. It is desirable during the operation of such processes to at all times know the amount of deposit on the catalyst in order that the quantity of combustion air may be accurately controlled. This is especially true in the so-called fluid catalyst cracking process because unless the combustion air is accurately controlled there are times when excess oxygen is present in the effluent gas from the regenerator and when such is the case a phenomenon known as afterburning often takes place. The conventional method for the determination of carbonaceous deposit on the catalyst is by means of combustion. This analytical method is slow and tedious and generally takes from 1 to 2 hours for completion. In this length of time conditions in the plant can deviate considerably from those desired.

The present invention, therefore, provides an apparatus useful for the rapid measurement of the carbonaceous deposit on the catalyst.

The present invention also provides a system for the continuous determination of changes in chemical composition of other materials as well as the amount of carbonaceous deposit on various solid catalysts.

By means of the present invention a continuous check may be had on the catalyst in the plant at all times.

In prior methods and apparatus useful for the determination of carbonaceous deposit on catalyst, the general procedure is to withdraw a sample from the plant and then analyze it batchwise in combustion type apparatus. The combustion products are then collected and the analysis determined from the quantities of the various combustion products. The present invention eliminates a considerable time lapse between the taking of the sample and the final determination and makes it possible to obtain the analysis almost immediately after a sample is taken.

In one specific embodiment the present invention concerns an apparatus for the continuous determination of the chemical composition of flowing materials which comprises in combination an insulating conduit, means for passing a stream of material therethrough at a substantially constant rate, means for imposing a field of high frequency alternating electric current across a section of said conduit, and means measuring the temperature of said stream before and after it passes through said field of high frequency alternating electric current.

The method of analysis which forms the basis for the apparatus of the present invention is described in more detail and is claimed in copending application Serial No. 565,694, filed November 29, 1944, by Herbert A. Hulsberg.

In general, the present apparatus depends upon the heating effected by the radio frequency field through which the material being analyzed is passed. With a given frequency and current input, when the character of the material is such as to absorb more heat energy, the heating effect will be greater and the temperature rise correspondingly higher. With the present apparatus, as the stream of material is continuously passed therethrough, the inlet and outlet temperatures are measured and by use of a predetermined heating curve the analysis is made. This curve may be drawn by calibrating the apparatus with known materials.

In making carbonaceous deposit determinations with the apparatus of the present invention it is essential that the moisture content of the catalyst be maintained at a practical minimum in order that the effect of water in the sample does not offset the effect of the carbonaceous deposit on the radio frequency loss. The radio frequency employed is not particularly critical although with higher frequencies it will be generally found that the rate of heating is higher for a given current. In general, frequencies of about 15 megacycles or thereabouts are recommended, although it is well within the scope of the invention to use higher or lower frequencies. The current input to the electrodes which should be employed is dependent upon the speed at which it is desired to pass the material through the apparatus.

The accompanying diagrammatic drawing and following description thereof are included in this specification to more clearly point out the features and advantages of the present invention.

Figure 1 illustrates one form of the invention.
Figure 2 shows a cross-sectional view taken as indicated by line 2—2 in Figure 1.
Figure 3 illustrates a form of the invention adapted for use in the determination of carbonaceous deposit in a fluid catalytic cracking plant.

Referring now to Figures 1 and 2, 1 denotes an insulating tube comprised of quartz, Pyrex glass, or similar material which has a very low radio frequency loss. This tube is connected by means of flanges to conduit 2 which in turn is connected to a suitable source of supply of the material to be analyzed. At its opposite end insulating tube 1 is connected by means of suitable flanges or other connecting means to conduit 3 in which is disposed rotary valve 4. The purpose of valve 4 is to maintain a uniform rate of flow of material through the apparatus and in order to do this it is only necessary to rotate the valve at a substantially constant speed by means of a synchronous motor or the like.

Disposed along opposite sides of insulating tube 1 are electrodes 5 and 6 which are respectively connected to radio frequency oscillator 7 by means of conductors 8 and 9. The electrodes may be secured to insulating tube 1 by means of cement, clamps or other suitable means. Precautions must be taken to prevent unnecessary losses between the electrodes other than through the material being tested. The current supplied to the electrodes is measured by means of radio frequency ammeter 10. Oscillator 7 may be any of a number of conventional oscillators designed to give the necessary current and is supplied with power from a suitable source by means of conductors 11 and 12. A thermocouple 13 is placed in insulating tube 1 to measure the temperature of material entering the apparatus. It is well within the scope of the invention to place this thermocouple in conduit 2. Suitable temperature indicating or recording means 14 is connected to thermocouple 13. Temperature indicator or recorder 14 may be any standard potentiometer type instrument. At the outlet end of the apparatus, thermocouple 15 is disposed within insulating tube 1 as shown or in conduit 3. This thermocouple is connected to a suitable temperature indicating instrument 16.

Referring now to Figure 3, conduit 2 is shown connected to cooler 17 which in turn is connected by means of conduit 18 and valve 19 to conduit 20. Cooler 17 is provided with inlet and outlet connections 21 and 22 provided respectively with valves 23 and 24 by means of which a suitable cooling medium may be passed in indirect heat exchange with the material to be analyzed. In this particular form of the invention the passage of material between the electrodes is regulated by valve 19 in conduit 18 and valve 25 in conduit 26. Also in this form of the invention thermocouples 13 and 15 are connected to a differential type of instrument 27 which will give a direct reading of the temperature difference between the inlet and outlet of the apparatus.

In operation, valves 19 and 25 are opened to the desired degree whereby the pressure within conduit 20 will act to force material through the apparatus. Oscillator 7 is regulated to give the desired frequency and current and the carbonaceous deposit analysis is continually made by reference to the temperature differential indicated by instrument 27 as compared to that given for known samples.

I claim as my invention:

1. An apparatus of the class described which comprises in combination an insulating conduit, means for passing a stream of material therethrough at a substantially constant rate, means for imposing a field of high frequency alternating electric current across a section of said conduit, and means for measuring the temperature of said stream before and after it passes through said field of high frequency alternating electric current.

2. An apparatus of the class described which comprises in combination a radio frequency insulating conduit, means for passing a stream of material therethrough at a substantially constant rate, a pair of electrodes disposed along opposite sides of a portion of said conduit and connected to a radio frequency oscillator, and means for measuring the temperature of said stream before and after it passes through said conduit between said electrodes.

3. An apparatus of the class described comprising in combination an insulating conduit connected at one end to a supply conduit containing flow regulating means and at its opposite end to a discharge conduit containing flow regulating means, means for imposing a field of high frequency alternating electric current across a section of said insulating conduit, a thermocouple in the inlet end of said insulating conduit, and a thermocouple in the outlet end of said insulating conduit.

4. The apparatus of claim 3 further characterized in that said thermocouples are connected to a differential temperature indicator.

ROBERT B. COLLINS.